United States Patent
Sivaraj et al.

(10) Patent No.: US 12,321,387 B2
(45) Date of Patent: Jun. 3, 2025

(54) AUTOMATICALLY GENERATING SEARCH INDEXES FOR EXPEDITING SEARCHING OF A COMPUTERIZED DATABASE

(71) Applicant: EQUIFAX INC., Atlanta, GA (US)

(72) Inventors: Sunit Sivaraj, Alpharetta, GA (US); Marek Ludomir Cyzio, Melbourne, FL (US); Haroon Syed, Flowery Branch, GA (US); Khizer Daniyal Syed, Cumming, GA (US)

(73) Assignee: Equifax Inc., Atlanta, GA (US)

( * ) Notice: Subject to any disclaimer, the term of this patent is extended or adjusted under 35 U.S.C. 154(b) by 0 days.

(21) Appl. No.: 18/181,785

(22) Filed: Mar. 10, 2023

(65) Prior Publication Data
US 2024/0303274 A1    Sep. 12, 2024

(51) Int. Cl.
*G06F 16/901* (2019.01)
*G06F 16/9535* (2019.01)

(52) U.S. Cl.
CPC ........ *G06F 16/901* (2019.01); *G06F 16/9535* (2019.01)

(58) Field of Classification Search
CPC . G06F 16/901; G06F 16/9535; G06F 16/2272
USPC ........................................................ 707/741
See application file for complete search history.

(56) References Cited

U.S. PATENT DOCUMENTS

| | | | | |
|---|---|---|---|---|
| 7,181,438 B1 * | 2/2007 | Szabo | ............... | G06Q 30/0269 705/14.27 |
| 7,426,507 B1 * | 9/2008 | Patterson | ............... | G06F 16/313 |
| 7,685,104 B2 * | 3/2010 | Ruhlow | ............... | G06F 16/2454 707/999.003 |
| 8,046,367 B2 * | 10/2011 | Saunders | ............... | G06F 16/951 707/711 |
| 8,745,033 B2 * | 6/2014 | Day | ............... | G06F 16/2453 707/715 |
| 8,874,549 B2 * | 10/2014 | Tunkelang | ............ | G06F 16/245 707/722 |
| 9,495,139 B2 * | 11/2016 | Stitt | ........................ | G06F 17/17 |

(Continued)

FOREIGN PATENT DOCUMENTS

CN         115146141 A  * 10/2022  ......... G06F 16/2264

OTHER PUBLICATIONS

European Application No. EP24162503.7, Extended European Search Report, Mailed on Sep. 17, 2024, 9 pages.

*Primary Examiner* — Phuong Thao Cao
(74) *Attorney, Agent, or Firm* — Kilpatrick Townsend & Stockton LLP (57) ABSTRACT

Search indexes can be automatically generated and used for expediting searching of a computerized database. For example, a system can access an inquiry dataset that includes relationships between prior inquiries and returned records from a database. The system can then generate a set of Boolean indexes based on the prior inquiries. The system can then identify frequent indexes that occur at least a threshold number of times in the set of Boolean indexes and that have estimated candidate sizes that are less than a threshold size. The system can then select the frequent index with the highest frequency from among the frequent indexes. The selected frequent index can be subsequently used to expedite searching of the database in response to receiving a search query associated with the frequent index from a client device.

18 Claims, 10 Drawing Sheets

(56) References Cited

U.S. PATENT DOCUMENTS

| | | | |
|---|---|---|---|
| 9,721,017 B2* | 8/2017 | Denninghoff | G06F 16/951 |
| 10,489,367 B2* | 11/2019 | Li | G06F 16/22 |
| 10,860,562 B1* | 12/2020 | Gupta | G06F 16/2453 |
| 11,036,702 B1* | 6/2021 | Zakharenko | G06F 16/22 |
| 12,032,609 B1* | 7/2024 | Naganathan | G06F 16/3329 |
| 2003/0158850 A1* | 8/2003 | Lawrence | G06F 16/313 |
| | | | 707/E17.084 |
| 2003/0212675 A1* | 11/2003 | Denesuk | G06F 16/951 |
| | | | 707/999.005 |
| 2005/0154710 A1* | 7/2005 | Ruhlow | G06F 16/2454 |
| 2008/0071769 A1 | 3/2008 | Jagannathan | |
| 2008/0288524 A1 | 11/2008 | Dumitru et al. | |
| 2012/0233127 A1* | 9/2012 | Solmer | G06F 16/3347 |
| | | | 707/769 |
| 2016/0092584 A1* | 3/2016 | Nigam | G06F 16/9024 |
| | | | 707/798 |
| 2018/0276264 A1* | 9/2018 | Zheng | G06F 16/2255 |
| 2020/0192961 A1* | 6/2020 | Safronov | G06F 16/9536 |

* cited by examiner

| Inq ID | Ref ID | fname Soundex | lname Soundex | fname exact | lname exact | zip4 | zip3 | zip exact | Dob year exact | Dob month exact | Dob day exact | Id 3-char | Id exact |
|---|---|---|---|---|---|---|---|---|---|---|---|---|---|
| 1 | 101 | true | true | true | true | true | true | false | true | false | true | true | false |
| 2 | 101 | true | true | true | true | false | false | false | true | false | true | true | true |
| 3 | 205 | true | true | true | true | true | true | true | true | true | true | false | false |
| 4 | 801 | true | false | false | false | true | true | true | true | true | true | true | true |

| Inq ID | Ref ID | fname Soundex | lname Soundex | fname exact | lname exact | zip4 | zip3 | zip exact | Dob year exact | Dob month exact | Dob day exact | Id 3-char | Id exact |
|---|---|---|---|---|---|---|---|---|---|---|---|---|---|
| 1 | 101 | true | true | true | true | true | true | true | true | false | true | true | true |
| 2 | 205 | true | true | true | true | true | true | true | true | true | true | false | false |
| 3 | 801 | true | false | false | false | true | true | true | true | true | true | true | true |

| Frequent Index | Count | Percentage | Estimated Candidate Size |
|---|---|---|---|
| fname | 90,000 | 90.0 | 2000 |
| Fname soundex, lname exact, zip3 | 50,000 | 50.0 | 35 |
| fname exact, dob year | 30,000 | 30.0 | 50 |
| Fname soundex, dob month, zip exact | 70,000 | 70.0 | 20 |
| fname exact, Id exact | 50,000 | 50.0 | 15 |
| lname exact | 90,000 | 90.0 | 3000 |
| lname soundex, zip3 | 40,000 | 40.0 | 100 |
| *** | *** | *** | *** |

| Frequent Index | Count | Estimated Candidate Size | Exact Candidate Size |
|---|---|---|---|
| Fname soundex, dob month, zip exact | 70,000 | 20 | 32 |
| fname exact, Id exact | 50,000 | 15 | 20 |

| Inq ID | Ref ID | fname Soundex | fname Soundex | fname exact | lname exact | zip4 | zip3 | zip exact | Dob year exact | Dob month exact | Dob day exact | Id 3-char | Id exact |
|---|---|---|---|---|---|---|---|---|---|---|---|---|---|
| 1 | 101 | true | true | true | true | true | true | true | true | false | true | true | true |
| 2 | ~~225~~ | ~~true~~ | ~~true~~ | ~~true~~ | ~~true~~ | ~~true~~ | ~~true~~ | ~~true~~ | ~~true~~ | ~~true~~ | ~~true~~ | ~~false~~ | ~~false~~ |
| 3 | ~~884~~ | ~~true~~ | ~~false~~ | ~~false~~ | ~~false~~ | ~~true~~ | ~~true~~ | ~~true~~ | ~~true~~ | ~~true~~ | ~~true~~ | ~~true~~ | ~~true~~ |

AUTOMATICALLY GENERATING SEARCH INDEXES FOR EXPEDITING SEARCHING OF A COMPUTERIZED DATABASE

TECHNICAL FIELD

The present disclosure relates generally to database searching on a computer system. More specifically, but not by way of limitation, this disclosure relates to automatically generating search indexes (e.g., Boolean indexes) usable to expedite searching of a computerized database.

BACKGROUND

A computerized database system can include one or more databases that can be searched based on a search query. For example, a client device may submit a search query with one or more search parameters to the database system. In response to receiving the search query, the database system can search through a database containing thousands or millions of records to identify a subset of the records that match the search parameters. The database system can then return the identified subset of records to the client device.

SUMMARY

One example of the present disclosure can include a non-transitory computer-readable medium comprising program code that is executable by one or more processors for causing the one or more processors to perform an index-identification process involving operations. The operations can include: accessing an inquiry dataset that includes relationships between prior inquiries and returned records, wherein each of the prior inquiries is correlated in the inquiry dataset to a corresponding set of returned records; generating a set of Boolean indexes based on the prior inquiries in the inquiry dataset; identifying frequent indexes that occur at least a threshold number of times in the set of Boolean indexes and that have estimated candidate sizes that are less than a threshold size; selecting a frequent index that has a highest frequency from among the frequent indexes; and storing the frequent index for subsequent use in expediting searching of the database in response to receiving a search query associated with the frequent index from a client device.

Another example of the present disclosure can include a method of operations. The operations can include: accessing an inquiry dataset that includes relationships between prior inquiries and returned records, wherein each of the prior inquiries is correlated in the inquiry dataset to a corresponding set of returned records; generating a set of Boolean indexes based on the prior inquiries in the inquiry dataset; identifying frequent indexes that occur at least a threshold number of times in the set of Boolean indexes and that have estimated candidate sizes that are less than a threshold size; selecting a frequent index that has a highest frequency from among the frequent indexes; and storing the frequent index for subsequent use in expediting searching of the database in response to receiving a search query associated with the frequent index from a client device. Some or all of the operations can be executed by one or more processors.

Yet another example of the present disclosure can include a system comprising one or more processors and one or more memories. The one or more memories can include program code that is executable by the one or more processors for causing the one or more processors to perform operations. The operations can include: accessing an inquiry dataset that includes relationships between prior inquiries and returned records, wherein each of the prior inquiries is correlated in the inquiry dataset to a corresponding set of returned records; generating a set of Boolean indexes based on the prior inquiries in the inquiry dataset; identifying frequent indexes that occur at least a threshold number of times in the set of Boolean indexes and that have estimated candidate sizes that are less than a threshold size; selecting a frequent index that has a highest frequency from among the frequent indexes; and storing the frequent index for subsequent use in expediting searching of the database in response to receiving a search query associated with the frequent index from a client device.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

DETAILED DESCRIPTION OF THE INVENTION

Certain aspects and features of the present disclosure relate to an index-generation engine that is executable to automatically generate search indexes usable to expedite searching of a database in a database system. More specifically, the index-generation engine can perform an iterative process through which an inquiry dataset is analyzed to generate the search indexes. After the search indexes have been generated, they can be used to expedite searching of the database. For example, a client device can submit a search query to the database system. The database system can then match the search query to one of the search indexes. That search index can be run against the database to obtain a candidate set of records related to the search query. The candidate set of records can contain substantially fewer records than the total number of records in the database. For example, the candidate set of records may only contain 1000 records, whereas the database may contain millions of records. The search query can then be run against the candidate set of records to determine search results for the search query, which can be returned to the client device. Thus, rather than running the search query against the entire database, which can be slow and consume a significant amount of computing resources (e.g., processing power, memory, and electrical power), the search index can be used to significantly reduce the search space for the search query. This can drastically reduce the computational overhead and latency related to the search process, while still providing search results that are of similar accuracy to searching the entire database.

To determine the search indexes, the index-generation engine may begin by receiving an inquiry dataset that includes relationships between prior inquiries and returned records. A prior inquiry is a search query previously submitted to the database system by one or more client devices. The returned records are records that were returned from the database system in response to the prior inquiries. Each prior inquiry can be correlated in the inquiry dataset to a corresponding set of returned records from the database system. Each set of returned records may include one or more returned records. For example, if the search query involves a particular entity (e.g., a person), the returned set of records may include one or more returned records involving that particular entity. For instance, the returned set of records can include a first record with a current address of the entity and a second record with a prior address of the entity.

After receiving the inquiry dataset, the index-generation engine can generate a set of Boolean indexes based on the inquiry dataset. For example, the index-generation engine can transform each row in the inquiry dataset into a corresponding Boolean index. A Boolean index can include one or more key-value pairs, where each key corresponds to a unique search criterion and has a corresponding Boolean value (e.g., TRUE or FALSE).

After generating the set of Boolean indexes, the index-generation engine may perform a deduplication process on the set of Boolean indexes to reduce the total number of Boolean indexes in the set. In some examples, the deduplication process can involve identifying multiple Boolean indexes that correspond to the same returned record. Aspects of the multiple Boolean indexes can then be combined together to form a single Boolean index for that returned record. By performing the deduplication process, the set of Boolean indexes may be reduced. Following the deduplication process, there may be only one Boolean index corresponding to each returned record in the inquiry dataset.

The index-generation engine can next identify frequent indexes, in the set of Boolean indexes, that satisfy at least one criterion. A frequent index can be a Boolean index that occurs at least a threshold number of times in the set of Boolean indexes. One example of the criterion may be that the frequent indexes have estimated candidate sizes that are less than a maximum size. A candidate size can be the number of records returned by the database system in relation to a given Boolean index. The maximum size may be user customizable and selected to avoid frequent indexes that return an excessively large number of results (e.g., tens of thousands of results). In some examples, the index-generation engine can determine the estimated candidate sizes by using a heuristic function.

After determining the frequent indexes that satisfy the at least one criterion, the index-generation engine can select whichever frequent index has the highest frequency (e.g., occurs the most number of times) in the set of Boolean indexes as the search index. The index-generation engine can store the search index for subsequent use in expediting searching of the database.

In some examples, the index-generation engine can also determine an exact candidate size for each of the frequent indexes by applying the frequent index against the one or more databases in the database system. In response to applying the frequent index, the database system can return a number of records that correspond to the frequent index, where the number of returned records can be the exact candidate size for the frequent index. The exact candidate sizes may be optional, additional information that can be provided to a user overseeing the process, which can help the user confirm the accuracy of the results from the process.

In some examples, the above process may be iterated to determine multiple search indexes. For example, after identifying the first search index described above, the index-generation engine may remove the first search index from the previously generated set of Boolean indexes. The index-generation engine may also remove, from the previously generated set of Boolean indexes, any other search indexes that overlap with (e.g., contain) the first search index. In this way, the set of Boolean indexes can be refined to filter out Boolean indexes that are related to the first search index, since that search index has already been selected. The index-generation engine may then execute the last few steps of the process again (e.g., from the step of identifying the frequent indexes onward) to identify and store a second search index. After identifying the second search index, the index-generation engine may again filter the set of Boolean indexes and iterate the process. And so on, until a stopping condition is satisfied. At the conclusion of the iterative process, the index-generation engine may have automatically identified multiple search indexes that can be used in the manner described above to expedite subsequent searching of the database.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Figure 1:
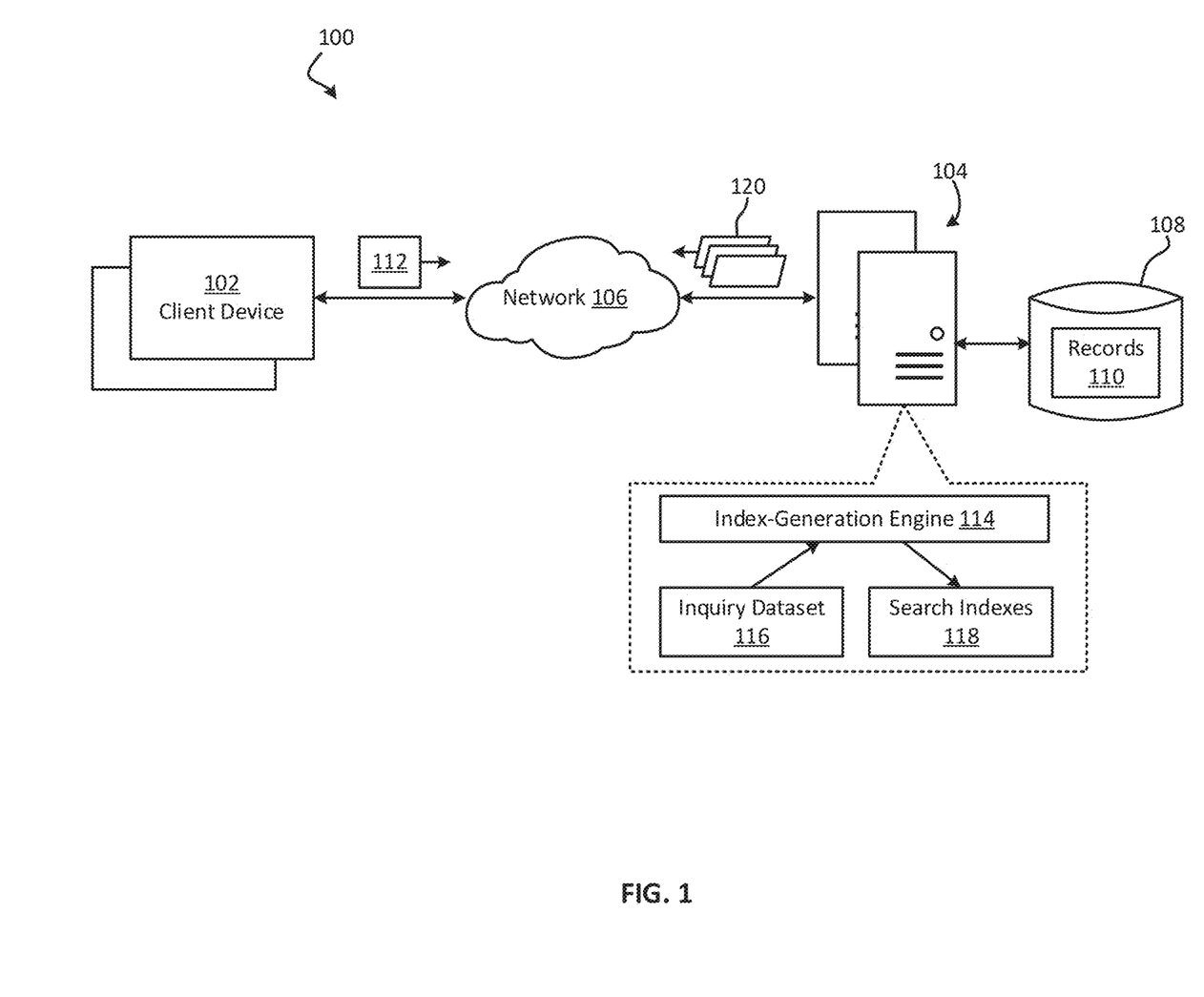
FIG. 1 shows a block diagram of an example of a system for generating and using search indexes to expedite searching of a computerized database according to some aspects of the present disclosure.

FIG. 1 shows a block diagram of an example of a system 100 for generating and using search indexes to expedite searching of a computerized database according to some aspects of the present disclosure. In this example, the system 100 includes a client-server architecture containing a client side and a server side. The client side can include one or more client devices 102, such as desktop computers, laptop computers, mobile phones, servers, and wearable devices.

The server side can include a server system 104 coupled to a database 108. The server system 104 can include one or more servers, and the database 108 can include one or more databases 108. The server system 104 and database 108 may collectively form a database system, to which search queries can be submitted by the client devices 102. In particular, the client devices 102 can submit search queries 112 to the database system via one or more networks 106, such as a local area network or the Internet. Based on the search queries 112, the database system can generate search results 120 and return them to the client devices 102. In some examples, the search results 120 can include a set of records selected from among a larger group of records 110 (e.g., tens of millions of records) stored in the database 108.

To help expedite the search process, the server system 104 can include search indexes 118. The search indexes 118 can be used to reduce the search space applied to a given search query from the client devices 102. For example, the client device 102 can submit a search query 112 to the server system 104. The server system 104 can receive the search query 112 and, in response, determine which of the search indexes 118 corresponds to the search query 112. A search index 118 may correspond to the search query 112 if the search index 118 has keys and Boolean values that match the search query 112. For example, if the search query 112 may be {FIRST_NAME=JOHN, LAST_NAME=DOE, STATE=NC}, a matching search index may be {FIRST_NAME=TRUE, LAST_NAME=TRUE, STATE=TRUE, ADDRESS=FALSE, DOB=FALSE}. This search index matches the search query 112 because it has the Boolean value "TRUE" related to the required search fields (first name, last name, and state) in the search query 112.

Once a matching search index has been identified from among the group of search indexes 118, the server system 104 can apply the search index against the database 108 to determine a candidate set of records. For example, the server system 104 can identify, as the candidate set of records, all of the records in the database 108 that satisfy the search index. This candidate set of records can then be used as the search space for the search query 112. For example, the server system 104 can then determine which records, in the candidate set of records, satisfy the search query 112. Because the candidate set of results will have substantially fewer records than the entire database 108, this search space is significantly smaller than searching the entire database 108. As a result, the server system 104 can determine the search results 120 for the search query 112 at a significantly faster pace, and with less computational overhead, than would be required to search the entire database 108.

To generate the search indexes 118, the server system 104 can include an index-generation engine 114. The index-generation engine 114 can perform an iterative process to automatically generate the search indexes 118. This iterative process is described in greater detail later on with respect to FIG. 2, but in general it involves obtaining an inquiry dataset 116 and analyzing the inquiry dataset 116 to determine the search indexes 118. The inquiry dataset 116 can be a predefined dataset that includes relationships between prior inquiries and returned records. Each prior inquiry can be correlated in the inquiry dataset 116 to one or more returned records. The inquiry dataset 116 can be generated using any suitable approach. For example, the server system 104 can automatically log search queries and their returned results (e.g., returned records) over a time window, such as a one month time period. The log can then serve as the inquiry dataset 116.

Figure 2:
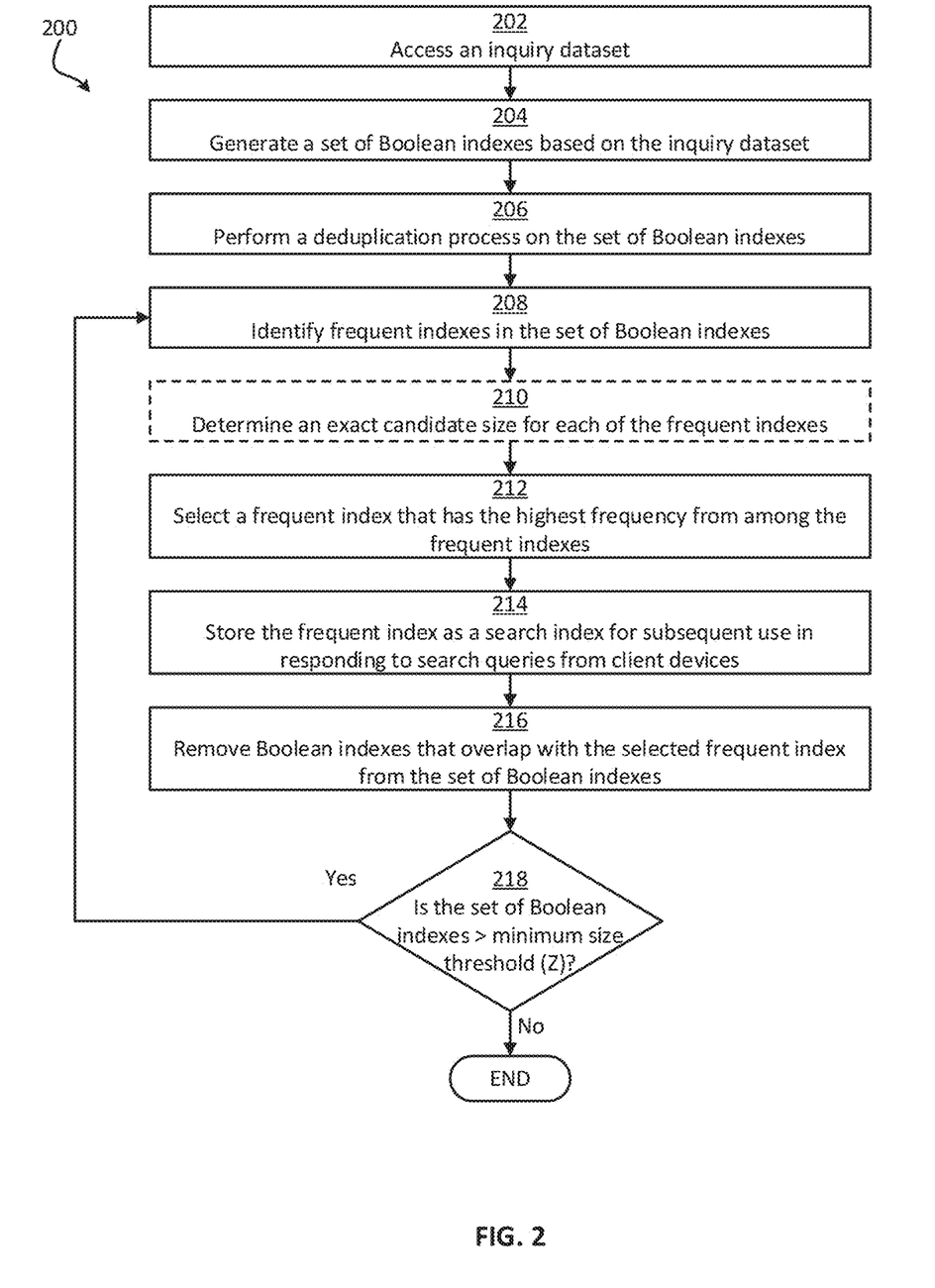
FIG. 2 shows a flowchart of an example of a process for automatically generating search indexes according to some aspects of the present disclosure.

FIG. 2 shows a flowchart of an example of a process 200 for automatically generating search indexes according to some aspects of the present disclosure. Other examples may involve more operations, fewer operations, different operations, or a different sequence of operations than is shown in FIG. 2. The operations of FIG. 2 will now be described below with reference to the components of FIG. 1 above.

In block 202, the index-generation engine 114 accesses an inquiry dataset 116. This may involve the server system 104 receiving or obtaining the inquiry dataset 116, for example from a database (e.g., database 108 or another database). The inquiry dataset 116 may include hundreds or thousands of rows. Each row may correspond to a prior inquiry and a returned record for the prior inquiry. If the same record was returned for multiple prior inquiries, the inquiry dataset 116 may include multiple rows for the same record, where each row corresponds to a different prior inquiry.

In block 204, the index-generation engine 114 generates a set of Boolean indexes based on the inquiry dataset 116. The index-generation engine 114 can transform each row in the inquiry dataset into a corresponding Boolean index. The Boolean index can include one or more key-value pairs. Each key can correspond to a unique search criterion in the prior inquiry. And each key can have a corresponding Boolean value (e.g., TRUE or FALSE), which can indicate whether the search criterion was required in the prior inquiry.

Figure 3:
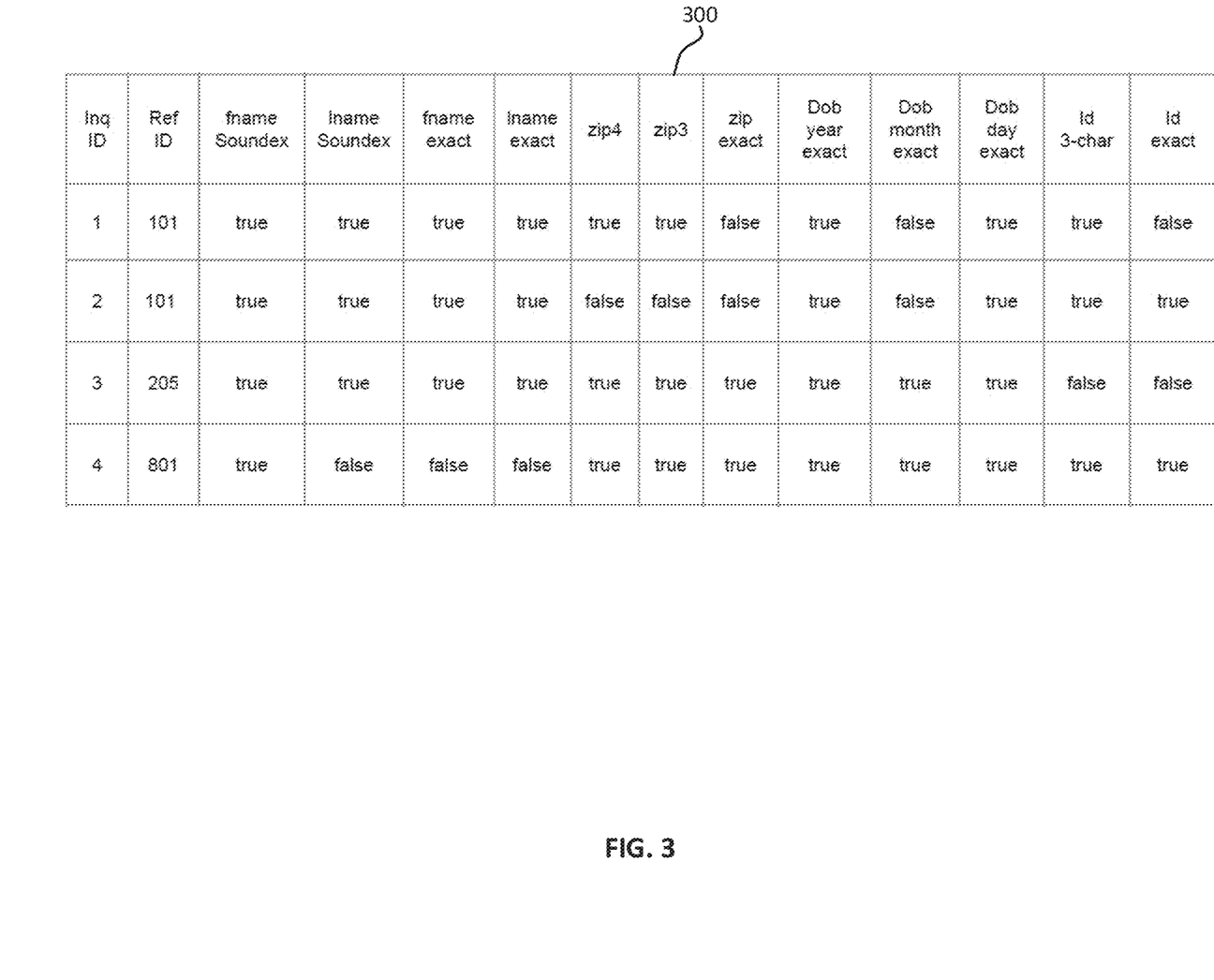
FIG. 3 shows an example of a set of Boolean indexes according to some aspects of the present disclosure.

One example of the set of Boolean indexes is shown table 300 of FIG. 3. As shown, each row in the table 300 can correspond to a Boolean index. Each row may have previously corresponded to a {prior inquiry, returned record} pair in the inquiry dataset 116, but may have been transformed into the Boolean index. In the table 300, the first column corresponds to an inquiry ID ("Inq ID"), which is a unique identifier of a prior inquiry. The second column corresponds to a reference ID ("Ref ID"), which is a unique identifier of a record returned in relation to the prior inquiry. The remaining columns in the table 300 correspond to the search criteria. In each row, a Boolean value is provided for each search criterion to indicate whether that search criterion was a requirement in the corresponding prior inquiry.

In block 206, the index-generation engine 114 performs a deduplication process on the set of Boolean indexes. This may involve identifying multiple Boolean indexes that correspond to the same returned record in the set of Boolean indexes. Aspects of the multiple Boolean indexes can then be combined together to form a single Boolean index for that returned record. For example, if a key has a TRUE value in one Boolean index and a FALSE value in another Boolean index, the two Boolean indexes can be combined together into a single Boolean index in which the TRUE value overrides the FALSE value, so that the key is set to TRUE in the combined Boolean index. Other schemes may additionally or alternatively be used to combine Boolean indexes together. By performing the deduplication process, the total number of Boolean indexes may be reduced.

Figure 4:
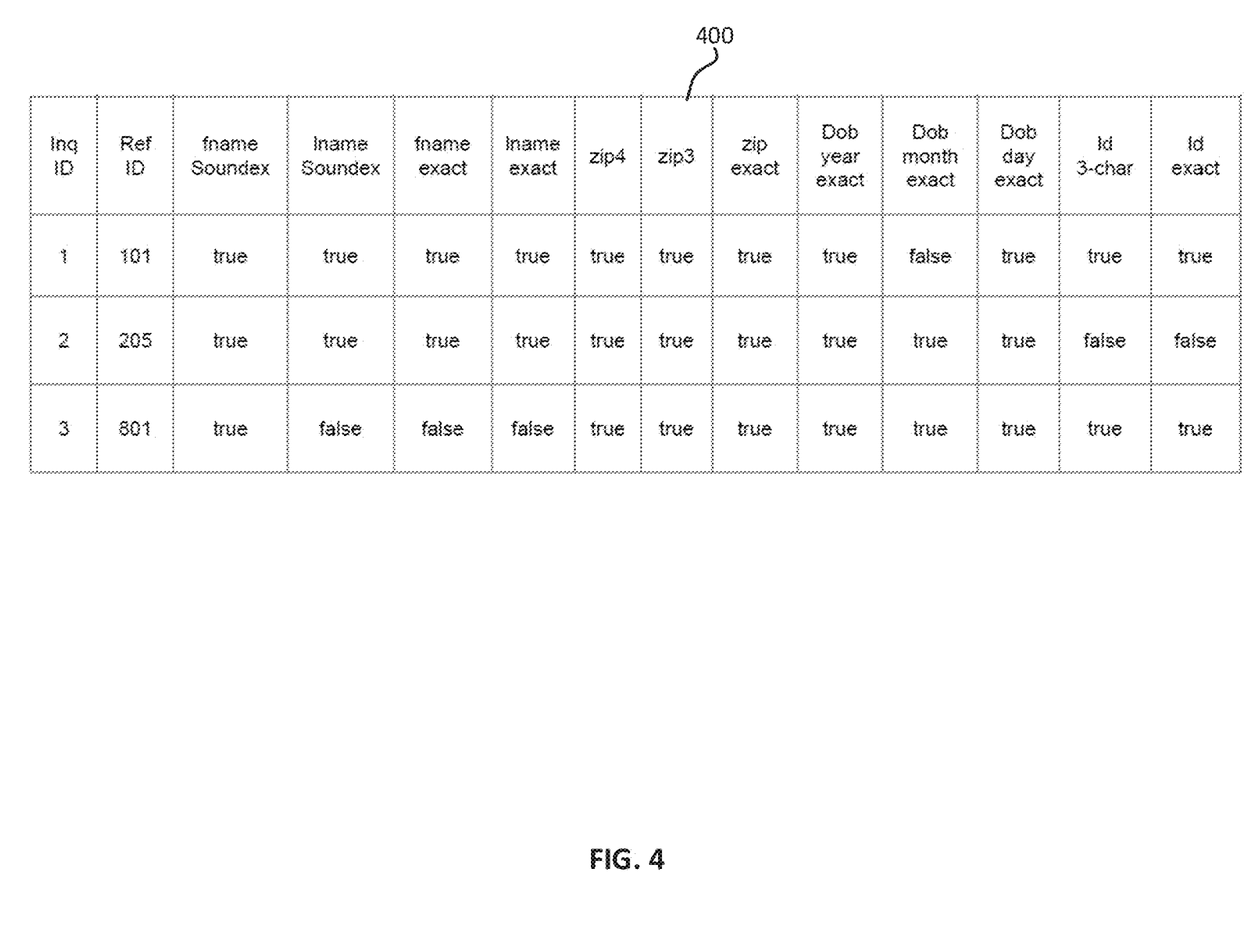
FIG. 4 shows an example in which the set of Boolean indexes from FIG. 3 have undergone a deduplication process according to some aspects of the present disclosure.

One example of a deduplicated set of Boolean indexes is shown in table 400 of FIG. 4, which shows the result of applying the deduplication process to the set of Boolean indexes shown in table 300 of FIG. 3. In table 300, there are two rows representing two Boolean indexes that correspond to the same returned record—record number 101. As shown in table 400, following the deduplication process, there is only a single row representing a single Boolean index corresponding to that returned record. To generate this combined Boolean index, where there were different values for the same key in the two Boolean indexes, the TRUE value has overridden the FALSE value.

In block 208, the index-generation engine 114 identifies frequent indexes in the set of Boolean indexes (e.g., the deduplicated set of Boolean indexes). A frequent index can be a Boolean index that occurs at least a threshold number of times in the set of Boolean indexes. The threshold number of times can be a predefined minimum number of times. This threshold number of times is also referred to herein as a "minimum support threshold" and designated as variable X. In some examples, to determine whether a Boolean index is a frequent index, the index-generation engine 114 can count the number of times in which a given Boolean index occurs in the set of Boolean indexes. The index-generation engine 114 can then compare that count to the minimum support threshold. If the Boolean index has a count that meets or exceeds the minimum support threshold, it can be designated a frequent index.

Not all frequent indexes may provide the same performance gain with respect to expediting searching of the database 108. For example, some frequent indexes may match a large number of records in the database 108, such as hundreds of thousands or millions of records. It may be desirable to ignore those frequent indexes, because they would return too many search results to meaningfully reduce the search space for a search query 112. Thus, in some examples, the index-generation engine 114 can limit the identified frequent indexes to only those that satisfy a cardinality criterion. The cardinality criterion can require a frequent index to return no more than a maximum number of records from the database 108. In the present disclosure, the returned records associated with a given frequent index are also referred to as the frequent index's "candidates," the number of returned records is also referred to as the frequent index's "candidate size," and the maximum number of records is also referred to as the "maximum candidate size threshold" and designated as variable Y. It will be appreciated that other criteria may additionally or alternatively be applied to reduce the total number of frequent indexes identified in block 208.

Figure 5:
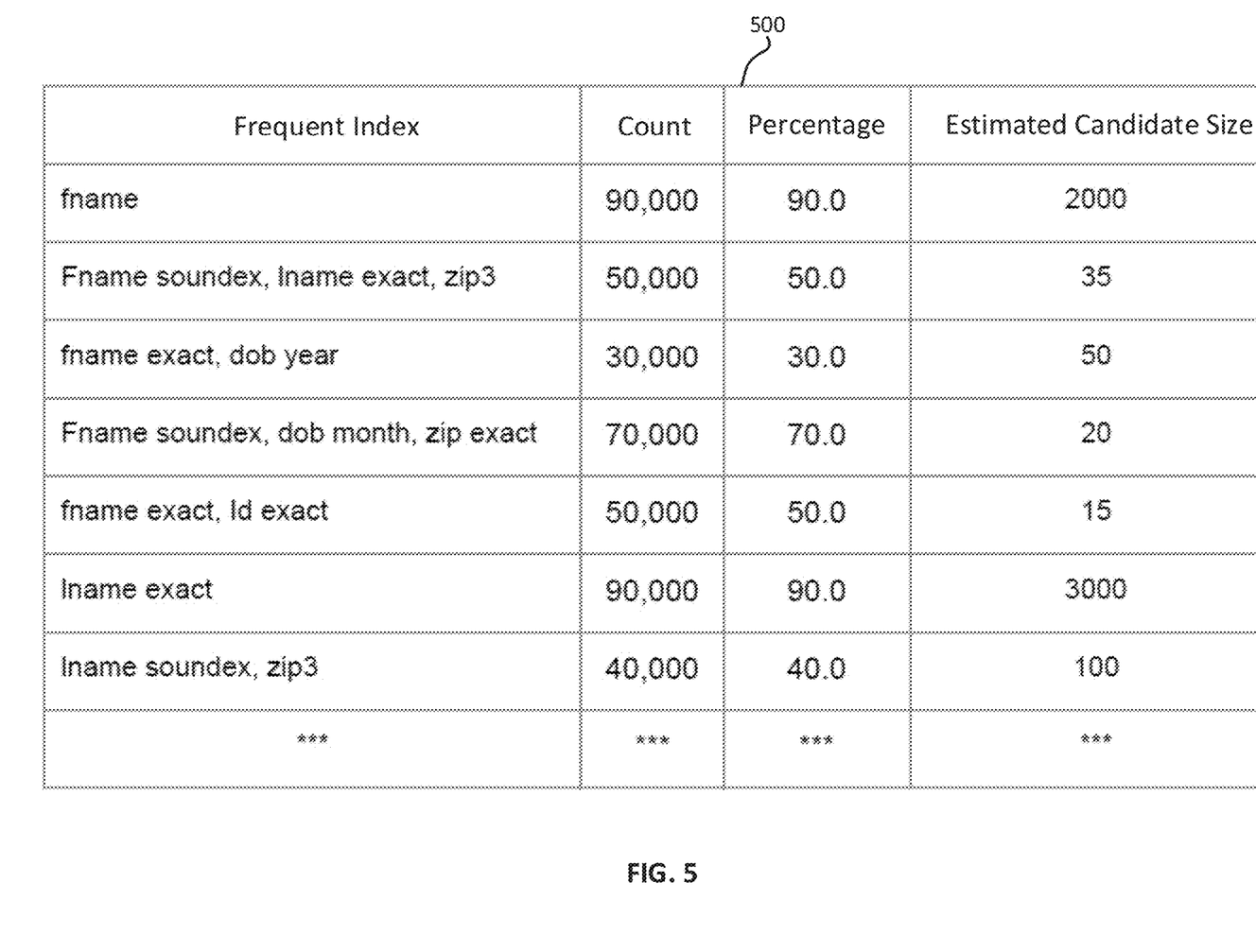
FIG. 5 shows an example of count sizes and estimated candidate sizes determined for frequent indexes according to some aspects of the present disclosure.
Figure 6:
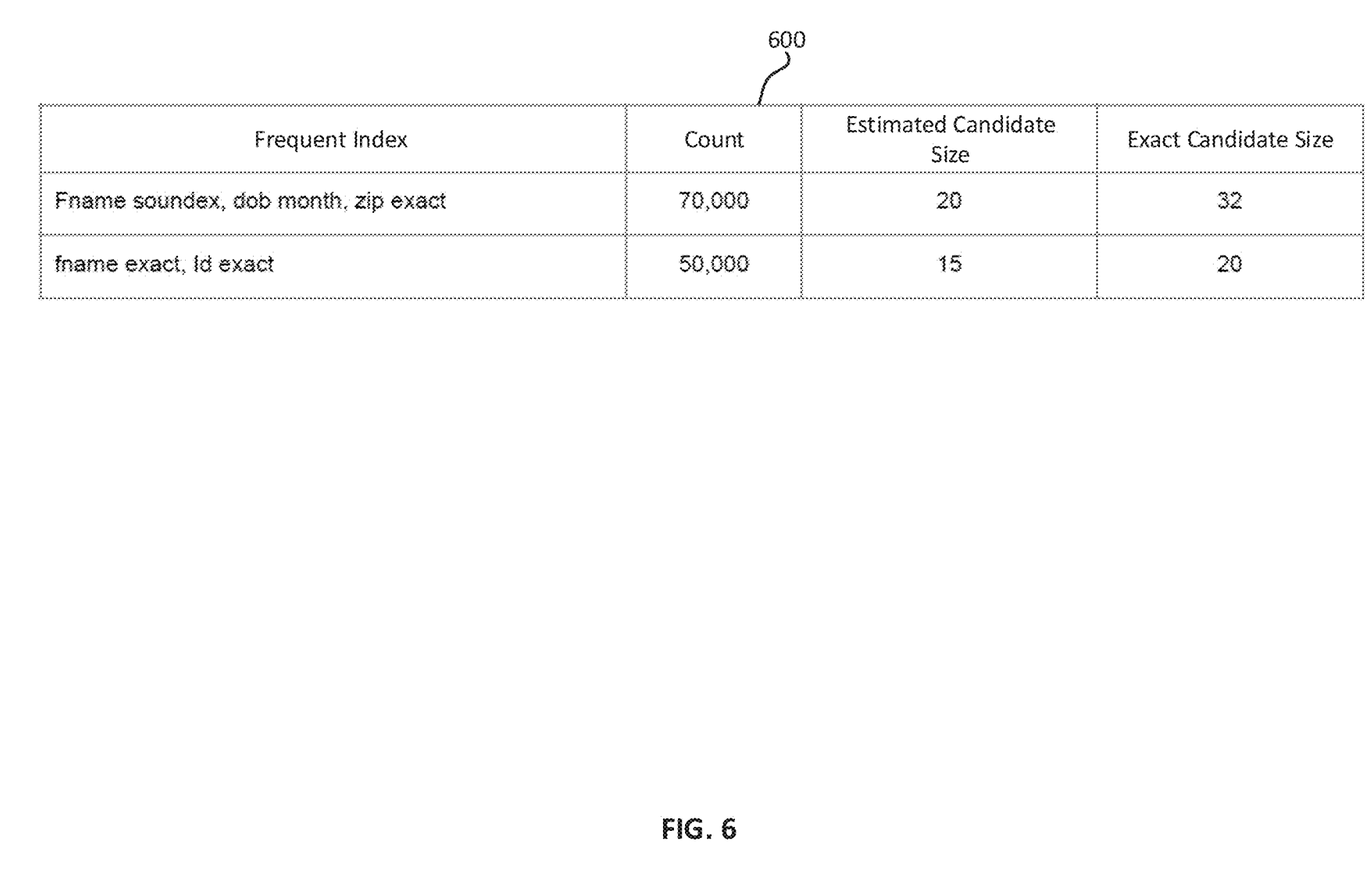
FIG. 6 shows an example of estimated candidate sizes and exact candidate sizes determined for frequent indexes according to some aspects of the present disclosure.

To determine which of the Boolean indexes are frequent indexes that satisfy the cardinality criterion, the index-generation engine 114 can execute an iterative process. An example of such an iterative process is described in greater detail later on with respect to FIGS. 8-9. But in general, the iterative process shown in FIGS. 8-9 can involve determining the number of times that (e.g., the frequent with which) each Boolean index occurred in the set of Boolean indexes, which can be referred to as the Boolean index's "count". The iterative process can also involve determining an estimated candidate size for each Boolean index using heuristics. Estimating the candidate size using heuristics may be significantly faster and less computationally burdensome than determining the exact candidate size for each Boolean index, for example by actually applying the Boolean index to the database 108 to determine the matching records. One example of a set of frequent indexes, their counts, and their estimated candidate sizes is shown in the table 500 of FIG. 5. After determining the counts and estimated candidate sizes for the Boolean indexes, the count and the estimated candidate size determined for each Boolean index can then be compared against dynamically adjustable thresholds (X and Y, respectively) to identify the frequent indexes that satisfy the cardinality criterion. This can help filter out the frequent indexes having estimated candidate sizes that are too large. This can also reduce the total number of frequent indexes used in subsequent operations, thereby conserving computing resources. One example of the filtered set of frequent indexes is shown in table 600 of FIG. 6. As shown, the total number of frequent indexes has been reduced from N in FIG. 5 to two in FIG. 6.

Continuing on with the process 200 of FIG. 2, in block 210, the index-generation engine 114 optionally determines exact candidate sizes for each of the frequent indexes identified in block 208. To determine the exact candidate size for a frequent index, the index-generation engine 114 can apply the frequent index against the database 108 to determine the matching records. The matching records can serve as the frequent index's candidates. And, the number of matching records can be the exact candidate size for the frequent index. Because determining the exact candidate size for a Boolean index may be computationally intensive (e.g., because an actual database query is being run against some or all of the database 108), reducing the total number of frequent indexes identified in block 208 can significantly lessen this computational burden. One example of exact candidate sizes for the identified frequent indexes is shown in table 600 of FIG. 6.

In block 212, the index-generation engine 114 selects the frequent index that has the highest frequency (e.g., occurred the most times in the set of Boolean indexes) from among the set of frequent indexes identified in block 208. For example, if a first frequent index occurred 50 times in the set of Boolean indexes, and a second frequent index occurred 90 times in the set of Boolean indexes, the second frequent index will be chosen because it is more frequent than the first frequent index.

In block 214, the index-generation engine 114 stores the selected frequent index as a search index for subsequent use in responding to search queries from client devices, such as search query 112 from client device 102. This may involve storing the selected frequent index in a list of search indexes 118, which can be matched to incoming search queries and used to limit the search space for those search queries.

Figure 7:
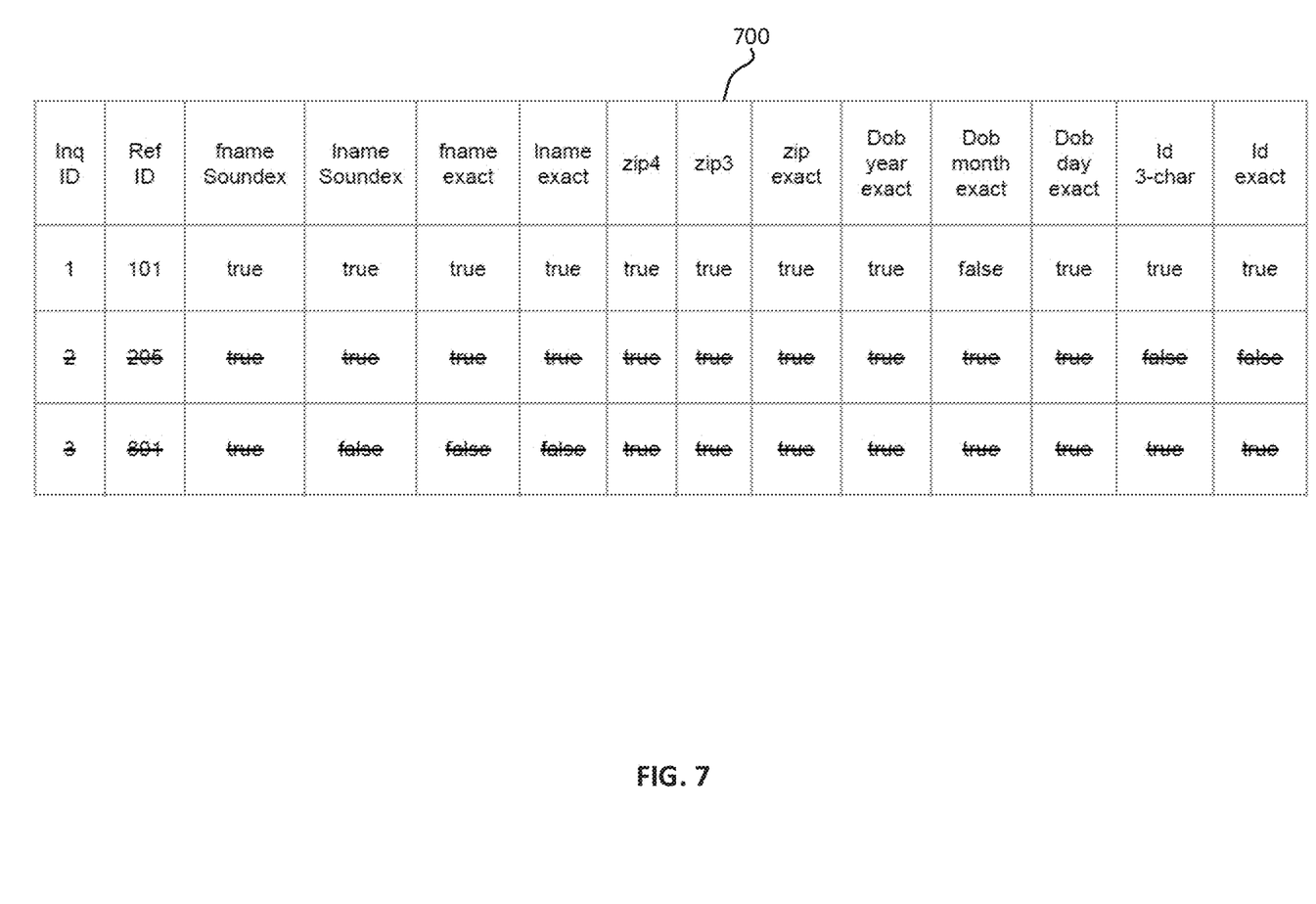
FIG. 7 shows an example of a reduced set of Boolean indexes, usable in a subsequent iteration of an index-identification process, according to some aspects of the present disclosure.

In block 216, the index-generation engine 114 removes one or more Boolean indexes that overlap with the selected frequent index from the set of Boolean indexes (generated in block 204). For example, the index-generation engine 114 can remove some or all occurrences of the selected frequent index from the set of Boolean indexes. The index-generation engine 114 may also remove other Boolean indexes that partially contain the selected frequent index from the set of Boolean indexes. This can reduce the total number of Boolean indexes that are in the set of Boolean indexes for the next iteration of the process 200, which in turn can expedite the next iteration of the process 200 and reduce duplicated work and computational overhead in the next iteration. After executing this step, all of the remaining Boolean indexes that remain in the set may be nonoverlapping with the selected frequent index. One example of this is shown in table 700 of FIG. 7, where the struck-through rows indicate that the corresponding Boolean indexes have been removed from the set.

In block 218, the index-generation engine 114 determines whether the set of Boolean indexes is greater than or equal to a minimum size threshold, designated herein as Z. The minimum size threshold can be the minimum number of Boolean indexes that are allowed to be in the set of Boolean indexes. The minimum size threshold may be user customizable and selected to ensure that there is a sufficient number of Boolean indexes in the set of Boolean indexes to conduct subsequent iterations of the process 200. If the set of Boolean indexes is less than the minimum size threshold (e.g., if the set of Boolean indexes contains less than the minimum number of Boolean indexes), the process 200 can end. Otherwise, the process 200 can return to block 208, at which point blocks 208-218 can repeat. Through this iterative process, multiple search indexes can be identified and stored for subsequent use in responding to search queries 112 from client devices 102.

Figure 8:
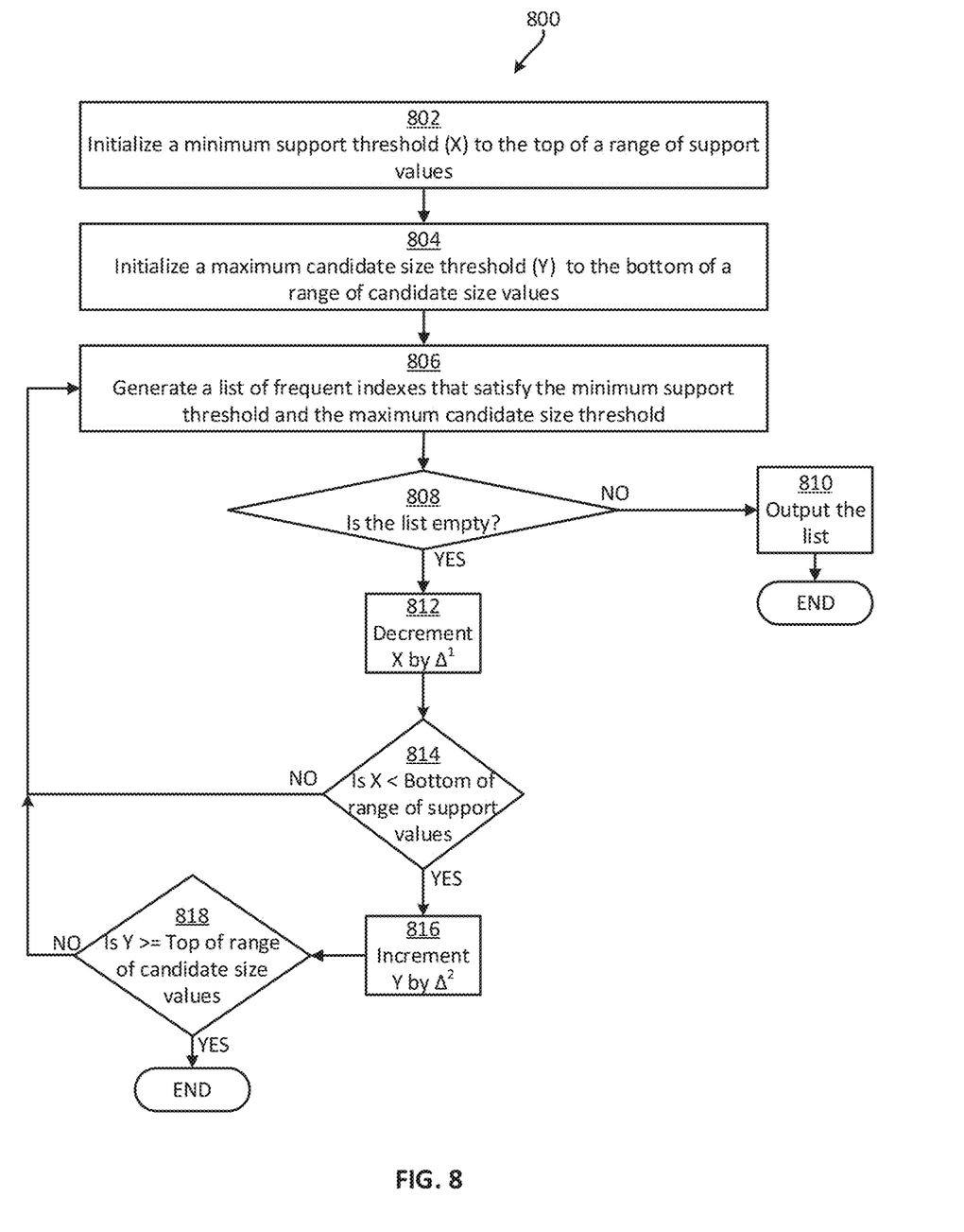
FIG. 8 shows a flowchart of an example of a process for generating a list of frequent indexes by iteratively adjusting a minimum support threshold and a maximum candidate size threshold according to some aspects of the present disclosure.
Figure 9:
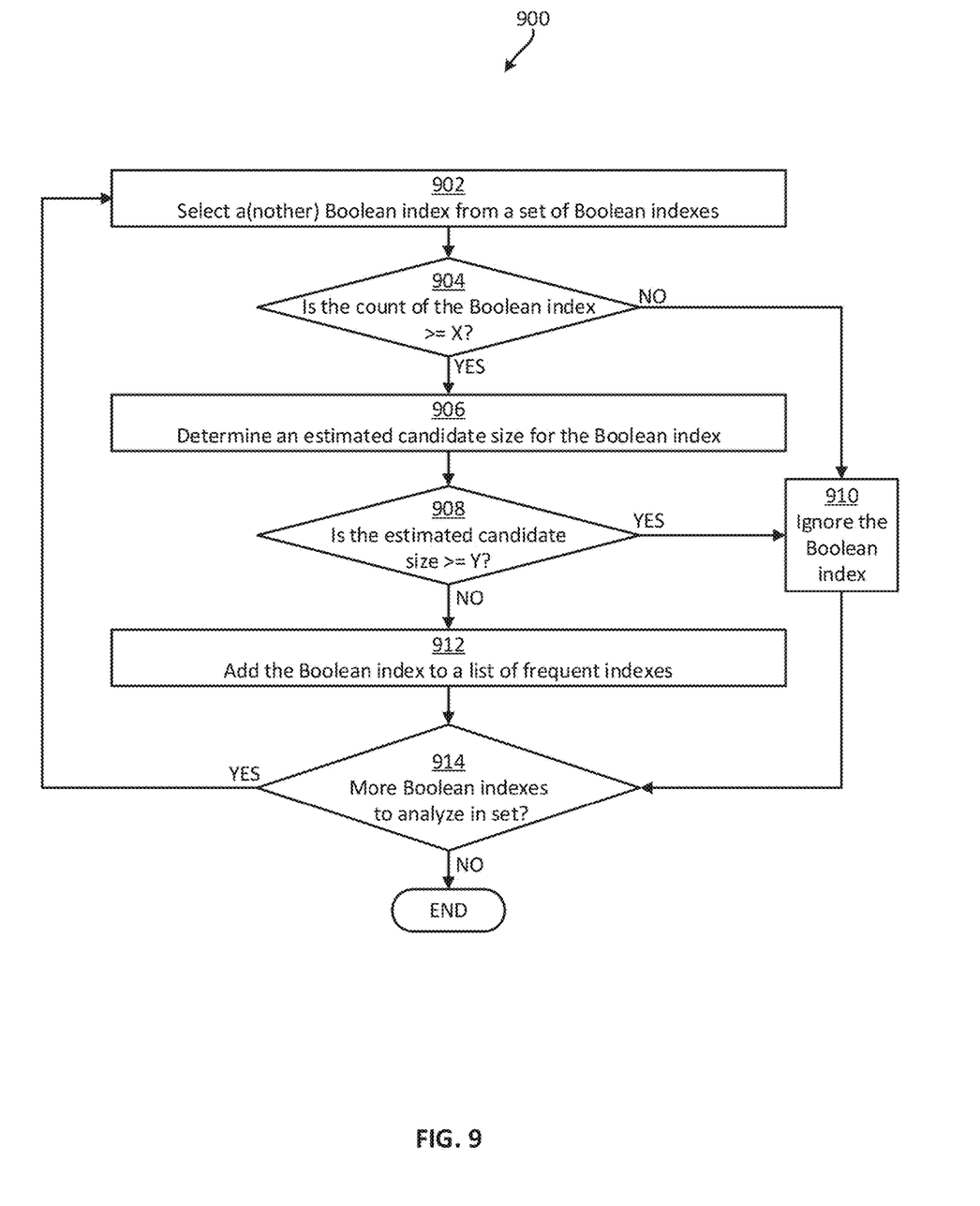
FIG. 9 shows a flowchart of an example of a process for identifying frequent indexes that satisfy a minimum support threshold and a maximum candidate size threshold according to some aspects of the present disclosure.

FIGS. 8-9 shows flowcharts of examples of processes for identifying frequent indexes in a set of Boolean indexes, for example as described above with respect to block 208, according to some aspects of the present disclosure. FIG. 8 shows an example of an outer iterative process 800 for generating a list of frequent indexes. FIG. 9 shows an example of an inner iterative process 900 associated with block 806 of FIG. 8. Each of these figures will now be described in turn below.

Referring now to FIG. 8, in block 802 the index-generation engine 114 initializes a minimum support threshold (X). The minimum support threshold may be initialized to the top of a range of support values. The range of support values can span from an upper boundary value to a lower boundary value. For example, the range of support values can span from 25% to 90%, where 25% is the lower boundary value and 90% is the upper boundary value. The top may correspond to the upper boundary value. The range of support values may be predefined and user customizable.

In block 804, the index-generation engine 114 initializes a maximum candidate size threshold (Y). The maximum candidate size threshold may be initialized to the bottom of a range of candidate size values. The range of candidate size values can span from a lower boundary value to an upper boundary value. For example, the range of candidate size values can span from 5 to 15, where 5 is the lower boundary value and 15 is the upper boundary value. The bottom may correspond to the lower boundary value. The range of candidate size values may be predefined and user customizable.

In block 806, the index-generation engine 114 generates a list of frequent indexes that satisfy the minimum support threshold and the maximum candidate size threshold. This step may be implemented by performing the process 900 shown in FIG. 9, as described in greater detail later on.

In block 808, the index-generation engine 114 determines whether the list is empty. If not, the process 800 proceeds to block 810 where the index-generation engine 114 outputs the list. Otherwise, the process 800 proceeds to block 812.

At block 812, the index-generation engine 114 decrements the minimum support threshold (X) by a predefined step size, designated herein as $\Delta^1$. For example, the index-generation engine 114 can decrement the minimum support threshold by 5%.

At block 814, the index-generation engine 114 determines whether the minimum support threshold (X) is less than the bottom of the range of support values. If not, the process 800 can return to block 806 and iterate with the new, dynamically adjusted, minimum support threshold. Otherwise, the process 800 proceeds to block 816.

At block 816, the index-generation engine 114 increments the maximum candidate size threshold (Y) by a predefined step size, designated herein as $\Delta^2$. The step size for incrementing the maximum candidate size threshold (Y) can be different from the step size for decrementing the minimum support threshold (X). For example, the index-generation engine 114 can increment the maximum candidate size threshold by 1.

At block 818, the index-generation engine 114 determines whether the maximum candidate size threshold (1) is greater than or equal to the top of the range of candidate size values. If not, the process can return to block 806 and iterate with the new, dynamically adjusted, maximum candidate size threshold. Otherwise, the process 800 can end. Through this iterative process 800, the minimum support threshold and the maximum candidate size threshold can be dynamically adjusted over time, for example until a list of frequent indexes can be successfully populated in block 806.

Referring now to FIG. 9, shown is an example of an inner iterative process 900 associated with block 806 of FIG. 8. At block 902, the index-generation engine 114 selects a Boolean index from the set of Boolean indexes. The index-generation engine 114 can select any Boolean index that has not yet been processed (e.g., that has not yet undergone process 900) from the set.

In block 904, the index-generation engine 114 determines whether the Boolean index's count is greater than or equal to the minimum support threshold (X). If not, the process 900 can proceed to block 910 and the selected Boolean index can be ignored (e.g., discarded). Otherwise, the process 900 can proceed to block 906.

In block 906, the index-generation engine 114 determines an estimated candidate size for the Boolean index. In some examples, the index-generation engine 114 can determine the estimated Boolean size for a Boolean index by determining sub-candidate sizes for each Boolean field in the Boolean index and then combining the sub-candidate sizes together using one or more mathematical operations. For example, if the Boolean index is {FIRST_NAME=TRUE, LAST_NAME=TRUE, STATE=TRUE}, the index-generation engine 114 can determine a first sub-candidate size associated with FIRST_NAME=TRUE, a second sub-candidate size associated with LAST_NAME=TRUE, and a third sub-candidate size associated with STATE=TRUE. To determine the sub-candidate sizes, the index-generation engine 114 may consult a predefined mapping that correlates Boolean fields to sub-candidate sizes. The predefined mapping may have been previously generated by applying various Boolean fields against the database 108. The index-generation engine 114 may then, for example, multiply the three sub-candidate sizes together to compute the estimated candidate size for the Boolean index.

In block 908, the index-generation engine 114 determines whether the estimated candidate size for the Boolean index is greater than or equal to the maximum candidate size threshold (Y). If so, the process 900 can proceed to block 910 and the selected Boolean index can be ignored. Otherwise, the process 900 can proceed to block 912.

In block 912, the index-generation engine 114 adds the Boolean index to a list of frequent Boolean indexes.

In block 914, the index-generation engine 114 determines whether there are any more Boolean indexes left to analyze in the set. For example, the index-generation engine 114 determines whether there are any unprocessed Boolean indexes remaining in the set. If not, the process 900 can end. Otherwise, the process 900 can return to block 902, where another Boolean index can be selected and the process can repeat.

Figure 10:
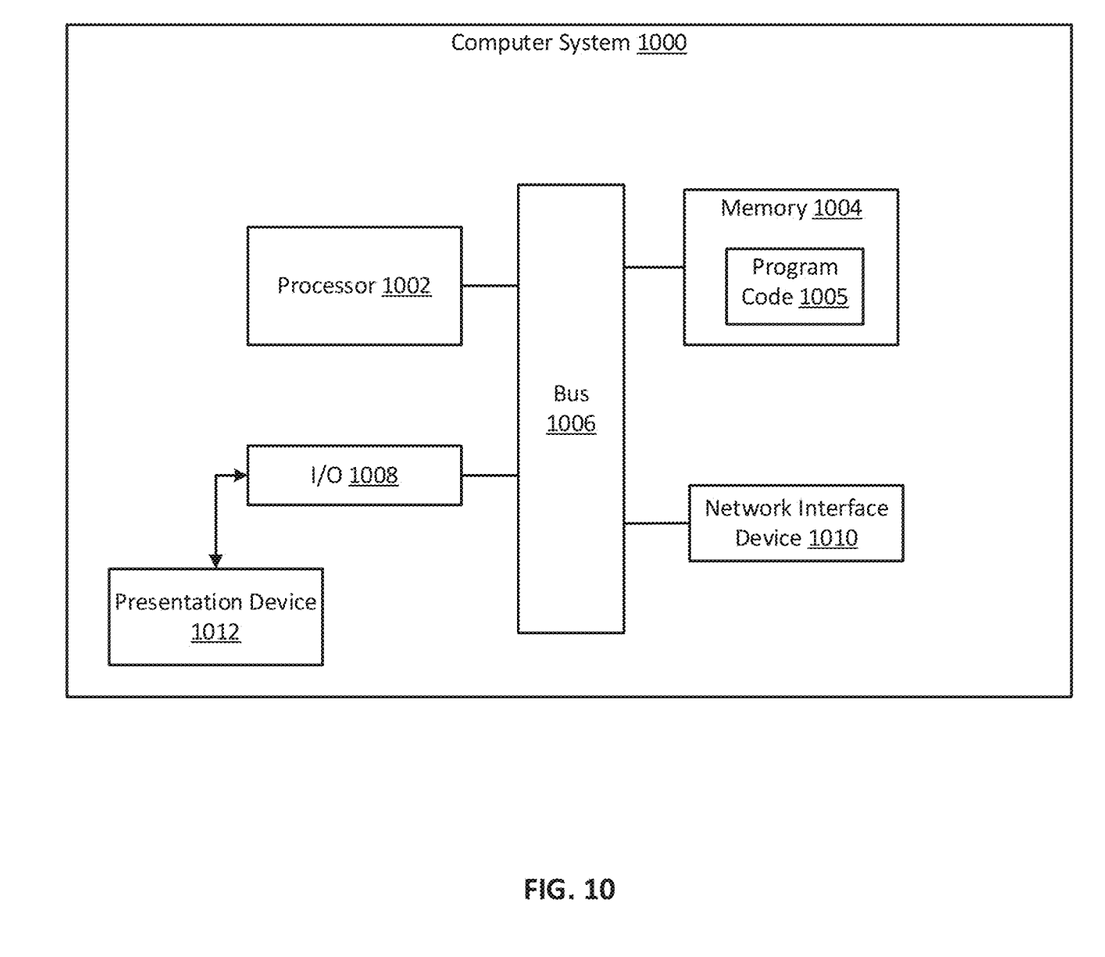
FIG. 10 shows a block diagram of an example of a computer system usable to implement some aspects of the present disclosure.

Any suitable computer system can be used to perform the operations described herein. For example, FIG. 10 is a block diagram depicting an example of a computer system 1000 that can be used to implement one or more aspects described herein. The computer system 1000 can include one or more computing devices for performing one or more of the operations described above.

The computer system 1000 can include a processor 1002. The processor 1002 can include one or more processing devices made from physical hardware. The processor 1002 can execute computer-executable program code 1005 stored in the memory 1004. Examples of a processor 1002 include a microprocessor, an application-specific integrated circuit, a field-programmable gate array, or any other suitable processing device. The processor 1002 can include or communicate with a memory 1004. The memory 1004 stores program code that, when executed by the processor 1002, causes the processor to perform the operations described herein.

The memory 1004 can include any suitable non-transitory computer-readable medium. A computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C #, Visual Basic, Java, Python, Perl, JavaScript, ActionScript, etc.

The computer system 1000 can execute program code 1005. The program code 1005 may be stored in any suitable computer-readable medium and may be executed on any suitable processing device. Executing the program code 1005 can configure the processor 1002 to perform one or more of the operations described herein. Program code 1005 stored in a memory 1004 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Examples of the program code 1005 include one or more of the applications, engines, or sets of program code described herein.

The computer system 1000 may also include a number of external or internal devices such as input or output devices. For example, the computer system 1000 is shown with an input/output interface 1008 that can receive input from input devices or provide output to output devices. Examples of the input devices can include a keyboard, mouse, touch-sensitive surface, etc. A bus 1006 can also be included in the computer system 1000. The bus 1006 can communicatively couple one or more components of the computer system 1000.

In some aspects, the computer system 1000 can include one or more output devices. One example of an output device is the network interface device 1010. A network interface device 1010 can include any device or group of devices suitable for establishing a wired or wireless data connection to one or more data networks (e.g., a public data network such as the Internet). Examples of the network interface device 1010 include an Ethernet network adapter, a modem, etc. Another example of an output device is the presentation device 1012. The presentation device 1012 can include any device or group of devices suitable for providing visual, auditory, haptic, or other suitable sensory output.

Examples of the presentation device 1012 include a touchscreen, a monitor, a speaker, a haptic actuator, or a separate mobile computing device.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A non-transitory computer-readable medium comprising program code that is executable by one or more processors for causing the one or more processors to perform an index-identification process involving:
   accessing an inquiry dataset that includes relationships between prior inquiries and returned records, wherein each of the prior inquiries is correlated in the inquiry dataset to a corresponding set of returned records from a database;
   generating a set of Boolean indexes based on the prior inquiries in the inquiry dataset, wherein each Boolean index in the set of Boolean indexes includes a respective set of key-value pairs;
   identifying frequent indexes in the set of Boolean indexes, wherein identifying the frequent indexes in the set of Boolean indexes involves:
      determining a plurality of indexes that occur at least a threshold number of times in the set of Boolean indexes;
      determining an estimated candidate size for each index in the plurality of indexes by applying a heuristic function; and
      selecting a subset of the plurality of indexes in which the estimated candidate sizes are less than a threshold size as the frequent indexes;
   selecting a frequent index that has a highest frequency from among the frequent indexes; and
   storing the frequent index for subsequent use in expediting searching of the database in response to receiving a search query associated with the frequent index from a client device.

2. The non-transitory computer-readable medium of claim 1, wherein generating the set of Boolean indexes based on the prior inquiries in the inquiry dataset comprises:
   for each of the prior inquiries in the inquiry dataset, generating a respective Boolean index for each record in the corresponding set of returned records indicating which fields of the prior inquiry match the record, to thereby produce a corresponding set of Boolean indexes based on the prior inquiry and its respective set of returned records.

3. The non-transitory computer-readable medium of claim 1, further comprising program code that is executable by the one or more processors for causing the one or more processors to:
   prior to identifying the frequent indexes in the set of Boolean indexes, generate a reduced set of Boolean indexes by performing a deduplication process on the set of Boolean indexes, wherein the deduplication process involves generating a combined Boolean index based on at least two Boolean indexes in the set of Boolean indexes corresponding to a same returned record, the combined Boolean index including at least one field value from a first Boolean index of the at least two Boolean indexes, and the combined Boolean index including at least one field value from a second Boolean index of the at least two Boolean indexes; and identify the frequent indexes from the reduced set of Boolean indexes.

4. The non-transitory computer-readable medium of claim 1, wherein determining the estimated candidate size for each index in the plurality of indexes by applying the heuristic function comprises:
for each index in the plurality of indexes, determining a respective estimated candidate size by multiplying together a plurality of candidate sizes assigned to a plurality of individual fields in the index.

5. The non-transitory computer-readable medium of claim 1, further comprising program code that is executable by the one or more processors for causing the one or more processors to:
receive the search query from the client device;
select the frequent index from among a plurality of stored frequent indexes identified using the index-identification process, based on determining that the frequent index corresponds to the search query;
in response to selecting the frequent index from among the plurality of stored frequent indexes, apply the frequent index against the database of records to identify a matching set of records;
apply the search query against the matching set of records to generate search results; and
return the search results to the client device as a response to the search query.

6. The non-transitory computer-readable medium of claim 1, further comprising program code that is executable by the one or more processors for causing the one or more processors to:
subsequent to selecting the frequent index, remove the frequent index and other indexes overlapping with the frequent index from the set of Boolean indexes, to thereby produce a reduced set of Boolean indexes; and
iterate at least some of the index-identification process on the reduced set of Boolean indexes, to determine another frequent index usable for expediting searching of the database in response to receiving another search query from one or more client devices.

7. A method comprising:
accessing, by one or more processors, an inquiry dataset that includes relationships between prior inquiries and returned records, wherein each of the prior inquiries is correlated in the inquiry dataset to a corresponding set of returned records from a database;
generating, by the one or more processors, a set of Boolean indexes based on the prior inquiries in the inquiry dataset, wherein each Boolean index in the set of Boolean indexes includes a respective set of key-value pairs;
identifying, by the one or more processors, frequent indexes in the set of Boolean indexes, wherein identifying the frequent indexes in the set of Boolean indexes involves:
determining a plurality of indexes that occur at least a threshold number of times in the set of Boolean indexes;
determining an estimated candidate size for each index in the plurality of indexes by applying a heuristic function; and
selecting a subset of the plurality of indexes in which the estimated candidate sizes are less than a threshold size as the frequent indexes;
selecting, by the one or more processors, a frequent index that has a highest frequency from among the frequent indexes; and storing, by the one or more processors, the frequent index for subsequent use in expediting searching of the database in response to receiving a search query associated with the frequent index from a client device.

8. The method of claim 7, wherein generating the set of Boolean indexes based on the prior inquiries in the inquiry dataset comprises:
for each of the prior inquiries in the inquiry dataset, generating a respective Boolean index for each record in the corresponding set of returned records indicating which fields of the prior inquiry match the record, to thereby produce a corresponding set of Boolean indexes based on the prior inquiry and its respective set of returned records.

9. The method of claim 7, further comprising:
prior to identifying the frequent indexes in the set of Boolean indexes, generating a reduced set of Boolean indexes by performing a deduplication process on the set of Boolean indexes, wherein the deduplication process involves generating a combined Boolean index based on at least two Boolean indexes in the set of Boolean indexes corresponding to a same returned record, the combined Boolean index including at least one field value from a first Boolean index of the at least two Boolean indexes, and the combined Boolean index including at least one field value from a second Boolean index of the at least two Boolean indexes; and
identifying the frequent indexes from the reduced set of Boolean indexes.

10. The method of claim 7, wherein determining the estimated candidate size for each index in the plurality of indexes by applying the heuristic function comprises:
for each index in the plurality of indexes, determining a respective estimated candidate size by multiplying together a plurality of candidate sizes assigned to a plurality of individual fields in the index.

11. The method of claim 7, further comprising:
receiving the search query from the client device;
selecting the frequent index, from among a plurality of stored frequent indexes, based on determining that the frequent index corresponds to the search query;
in response to selecting the frequent index from among the plurality of stored frequent indexes, applying the frequent index against the database of records to identify a matching set of records; and
applying the search query against the matching set of records to generate search results; and
returning the search results to the client device as a response to the search query.

12. The method of claim 7, further comprising:
subsequent to selecting the frequent index, removing the frequent index and other indexes overlapping with the frequent index from the set of Boolean indexes, to thereby produce a reduced set of Boolean indexes; and
based on the reduced set of Boolean indexes, determining another frequent index usable for expediting searching of the database in response to receiving another search query from one or more client devices.

13. A system comprising:
one or more processors; and
one or more memories including program code that is executable by the one or more processors for causing the one or more processors to perform operations including:
accessing an inquiry dataset that includes relationships between prior inquiries and returned records, wherein each of the prior inquiries is correlated in the inquiry dataset to a corresponding set of returned records from a database;

generating a set of Boolean indexes based on the prior inquiries in the inquiry dataset, wherein each Boolean index in the set of Boolean indexes includes a respective set of key-value pairs;

identifying frequent indexes in the set of Boolean indexes, wherein identifying the frequent indexes in the set of Boolean indexes involves:

determining a plurality of indexes that occur at least a threshold number of times in the set of Boolean indexes;

determining an estimated candidate size for each index in the plurality of indexes; and selecting a subset of the plurality of indexes in which the estimated candidate sizes are less than a threshold size as the frequent indexes;

selecting a frequent index that has a highest frequency from among the frequent indexes; and storing the frequent index for subsequent use in expediting searching of the database in response to receiving a search query associated with the frequent index from a client device.

14. The system of claim 13, wherein generating the set of Boolean indexes based on the prior inquiries in the inquiry dataset comprises:

for each of the prior inquiries in the inquiry dataset, generating a respective Boolean index for each record in the corresponding set of returned records indicating which fields of the prior inquiry match the record, to thereby produce a corresponding set of Boolean indexes based on the prior inquiry and its respective set of returned records.

15. The system of claim 13, wherein the one or more memories further comprise program code that is executable by the one or more processors for causing the one or more processors to:

prior to identifying the frequent indexes in the set of Boolean indexes, generate a reduced set of Boolean indexes by performing a deduplication process on the set of Boolean indexes, wherein the deduplication process involves generating a combined Boolean index based on at least two Boolean indexes in the set of Boolean indexes corresponding to a same returned record, the combined Boolean index including at least one field value from a first Boolean index of the at least two Boolean indexes, and the combined Boolean index including at least one field value from a second Boolean index of the at least two Boolean indexes; and identify the frequent indexes from the reduced set of Boolean indexes.

16. The system of claim 13, wherein the estimated candidate size for each index in the plurality of indexes is determined by applying a heuristic function.

17. The system of claim 16, wherein determining the estimated candidate size for each index in the plurality of indexes by applying the heuristic function comprises:

for each index in the plurality of indexes, determining a respective estimated candidate size by multiplying together a plurality of candidate sizes assigned to a plurality of individual fields in the index.

18. The system of claim 13, wherein the one or more memories further comprise program code that is executable by the one or more processors for causing the one or more processors to:

receive the search query from the client device;

select the frequent index, from among a plurality of stored frequent indexes, based on determining that the frequent index corresponds to the search query;

in response to selecting the frequent index from among the plurality of stored frequent indexes, apply the frequent index against the database of records to identify a matching set of records;

apply the search query against the matching set of records to generate search results; and return the search results to the client device as a response to the search query.

* * * * *